United States Patent [19]

Lynch

[11] 4,053,435
[45] * Oct. 11, 1977

[54] CATALYSTS FOR THE POLYMERIZATION OF ETHYLENE

[75] Inventor: Thomas J. Lynch, Oakmont, Pa.

[73] Assignee: Gulf Research & Development Company, Pittsburgh, Pa.

[*] Notice: The portion of the term of this patent subsequent to Aug. 31, 1993, has been disclaimed.

[21] Appl. No.: 609,191

[22] Filed: Sept. 2, 1975

Related U.S. Application Data

[62] Division of Ser. No. 557,498, March 12, 1975.

[51] Int. Cl.$^2$ .................... B01J 21/08; B01J 29/00
[52] U.S. Cl. ................................. 252/451; 252/458
[58] Field of Search ........................... 252/451, 458

[56] References Cited

U.S. PATENT DOCUMENTS

| 3,324,095 | 6/1967 | Carrick et al. | 252/458 X |
| 3,900,457 | 8/1975 | Witt | 252/458 X |

Primary Examiner—Carl F. Dees
Attorney, Agent, or Firm—Richard L. Kelly

[57] ABSTRACT

A process is disclosed for the preparation of a polymerization catalyst useful for the polymerization of ethylene. The catalyst consists of a chromium catalyst supported on a silica aerogel having a surface area of at least 300 square meters per gram and a pore volume of at least 2 milliliters per gram, said values being determined by isothermal liquid nitrogen desorption. The silica aerogel is prepared by a modification of the method disclosed by Kistler in U.S. Pat. No. 2,249,767.

3 Claims, 3 Drawing Figures

CATALYSTS FOR THE POLYMERIZATION OF ETHYLENE

This is a division of application Ser. No. 557,498 filed Mar. 12, 1975.

BACKGROUND OF THE INVENTION

One of the principal commercial processes employed to manufacture high density linear polyethylene is to polymerize ethylene in the presence of a chromium catalyst supported on silica. The active chromium catalyst may be chromium oxide or certain complex organic chromium compounds such as dicyclopentadienyl chromium II.

In a specific ethylene polymerization process, the polymerization is carried out in a hydrocarbon medium having little or no solvent action on the resin being produced, and the resin, as formed, precipitates as fine solid particles. For this reason, this particular process is known in the art as the Particle Form Process. As used throughout this specification, the term Particle Form Process will be restricted to a process carried out in the presence of a chromium catalyst supported upon silica and carried out in a hydrocarbon medium having solubility characteristics such that the resin, as produced, precipitates in the form of fine solid particles.

One of the limitations of the particle Form Process is that the resin produced by the process has a very high molecular weight and a correspondingly low melt index. For many purposes, the art desires polyethylene resins of lower molecular weight and correspondingly higher melt index. It obviously would be desirable to be able to operate the Particle Form Process under varying conditions such that the resin produced would have a preselected molecular weight and melt index, which molecular weight and melt index could be varied over a wide range.

Many workers hve attempted to modify the Particle Form Process to expand its capability to manufacture ethylene polymers having lower molecular weights and higher melt indexes. Such efforts have been directed principally to modifying the properties of the chromium supported catalysts employed in the process. The success of such efforts has been marginal, at best, and many workers in the art believe that the Particle Form Process inherently is restricted to the manufacture of high molecular weight — low melt index resins.

SUMMARY OF THE INVENTION

In accordance with the present invention, the applicant has discovered that ethylene polymers of significantly lower molecular weight and higher melt index can be prepared in the Particle Form Process by employing as the polymerization catalyst a chromium compound supported on a specially-prepared silica aerogel having both a large surface area and a large average pore volume.

DETAILED DESCRIPTION OF THE INVENTION

Figure 1:
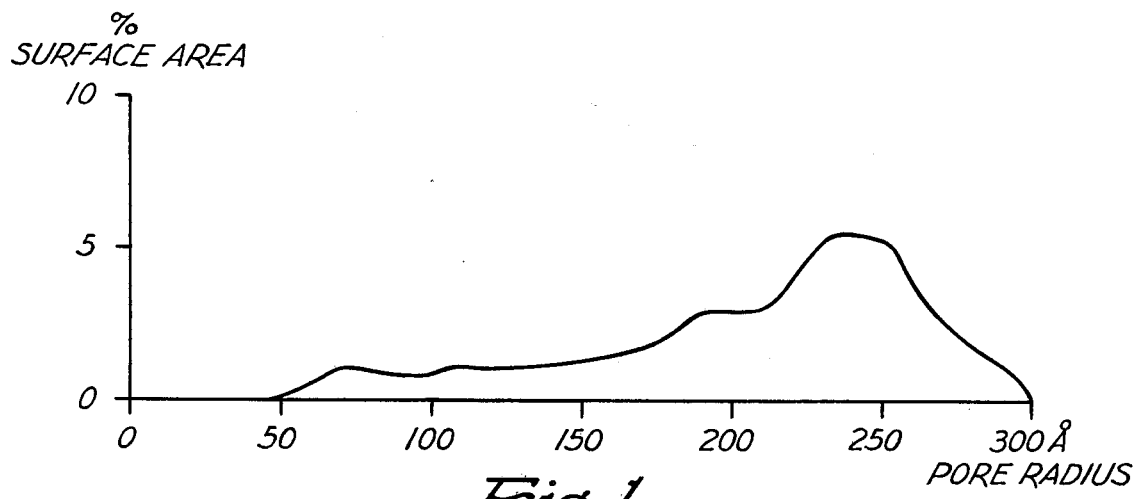
FIG. 1 of the drawings is a plot of % Surface Area Vs. Pore Radius of a silic a aerogel employed as a catalyst support in the practice of the present invention.

As noted above, the present invention is based upon the applicant's discovery that the molecular weight and melt index of ethylene polymers produced in the Particle Form Process can be importantly influenced by the specific polymerization catalysts employed in the process. The catalysts employed in the invention consist of a chromium compound supported upon a silica aerogel having a surface area of at least about 200 and preferably at least about 375 square meters per gram and a pore volume of at least about 2 and preferably at least 3 milliliters per gram, said values being determined by isothermal liquid nitrogen desorption.

The silica aerogels employed as supports for the chromium catalysts are novel compositions. As such, they constitute the subject matter of my copending application, Ser. No. 557,465, filed of even date herewith and now U.S. Pat. No. 3,977,993. In particular, the silica aerogels employed as the catalyst support in this invention have a combination of both a large surface area and a large pore volume not previously seen in any known silica aerogel.

The silica aerogels employed as a support for the chromium catalysts are prepared by a modification of the process disclosed by Samuel S. Kistler in U.S. Pat. No. 2,249,767. Certain aspects of the Kistler process and the properties of the silica aerogels produced thereby are set forth in J. Phys. Chem. 36, 52 (1932) and J. Am. Chem. Soc. 65, 1909 (1943).

The Kistler process for producing silica aerogels, as disclosed in U.S. Pat. No. 2,249,767, involves a series of steps in which a silica hydrogel is prepared by the acidification of water glass. The silica hydrogel as thus prepared consists of a slurry of the silica hydrogel in an aqueous medium. The silica hydrogel then is filtered free of the aqueous medium in which it is prepared and is washed with a solvent such as ethanol to free the silica hydrogel of water. The silica hydrogel, and the solvent in which it is then suspended, are transferred to a pressure-resistant vessel and heated to above the critical point of the organic solvent. After the temperature and pressure within the pressure-resistant vessel exceed the critical point, the solvent vapor is vented from the pressure-resistant vessel.

The resulting silica product is now referred to as a silica aerogel and has a very fine particle size and a very low bulk density. Such silica aerogels have relatively high surface areas, but relatively low pore volumes. It has been generally believed that the silica aerogels retain the gel structure of the silica hydrogels, with the liquid originally present in the gel having been displaced with air. By transmission electron microscopy data subsequently discussed in this application, the applicant has established that the pore structure of such silica hydrogels and silica aerogels are quite different from one another.

Silica aerogels, prepared as described above, by reason of their very small particle size and very low bulk densities, have many properties which differ significantly from the silica gels of commerce which are employed in hydrogel form. Such silica aerogels have been evaluated as a support for chromium catalysts employed in the Particle Form Process. The ethylene polymers produced with such catalysts do not differ in any significant respect from the ethylene polymers produced with the more conventional chromium catalysts employed commercially in the operation of the Particle Form Process and which consist of a chromium catalyst supported on a silica hydrogel.

Notwithstanding the fact that the silica aerogels produced by the Kistler method have no observable difference in performance characteristics as a support for chromium catalysts employed in the Particle Form Process, the applicant has discovered that polymerization catalysts having significantly different and significantly improved properties can be prepared when a chromium catalyst is supported on a silica aerogel prepared by a modified Kistler process, such silica aerogel having a surface area and pore volume within the range previously set forth.

The modified Kistler process employed to produce the silica aerogel supports for the catalysts employed in the present invention consists of the following steps:

1. First, a silica hydrogel is prepared by conventional techniques as by acidification of water glass with a mineral acid such as sulfuric acid.

2. Optionally, the silica hydrogel from step (1) is washed substantially free of alkali metal ions. This may be accomplished by filtering the hydrogel from the aqueous medium in which it is prepared and then washing the silica hydrogel with several aliquots of a dilute solution of either nitric acid or an ammonium salt such as ammonium nitrate.

3. The silica hydrogel then is freed of water by being placed in contact with a suitable organic solvent such as ethanol. The contacting is continued until substantially all of the water in the silica hydrogel is displaced with the organic solvent.

4. After the bulk of the water has been removed from the silica hydrogel*, the organic solvent in contact with the silica hydrogel then is treated to render it rigorously anhydrous and so that, in the final step of the treatment, after the system has reached equilibrium, the organic solvent contains less than 200 ppm of water.

*In strict terms, a hydrogel is a gel containing water. At this stage of the process, the water has been displaced with the organic solvent. Solely for convenience of description, the term hydrogel will be used to describe all gels containing a liquid therein. The term aerogel will be used when the liquid originally in the gel has been displaced with a gas, usually air.

5. The organic solvent-silica hydrogel mixture from step (4) then is transferred to a pressure-resistant vessel, and the organic solvent is removed therefrom by heating the mixture to above the critical point and releasing the organic solvent therefrom at a pressure at least equal to the critical pressure of the organic solvent.

6. After the organic solvent has been completely removed from the silica hydrogel, the resulting silica aerogel is brought back to ambient temperature and pressure under rigorously anhydrous conditions.

7. Finally, the silica aerogel from step (6) is calcined at an elevated temperature in a rigorously anhydrous environment.

In the preparation of the initial silica hydrogel, it is also possible to employ so-called cogels in which a mixture of metal oxides is included in the gel. Where cogels are employed, the silicon content of the metal component of the cogel must constitute at least 90 mol % of the total metal content. Any second metal included in the cogel should be selected from the group consisting of titanium, boron, vanadium, chromium, tungsten, molybdenum, aluminum and iron. Techniques for the manufacture of the initial silica hydrogel (including silica cogels) are well known in the art.

After the silica hydrogel has been prepared, it is preferred practice to wash the hydrogel free of alkali metal ions. Techniques for washing the hydrogel free of alkali metal ions are well known in the art. The reason for carrying out this step is to prevent sintering of the ultimate silica aerogel — with a resulting loss of pore volume — when the silica aerogel-supported chromium catalyst is heated to temperatures of the order of 1400° F. (770° C.) or higher to activate the catalyst. The step of washing the silica hydrogel free of alkali metal ions can be eliminated if the silica aerogel will not be subjected to such elevated temperatures.

In the third step of the process, the water present in the initially-prepared silica hydrogel is replaced with an organic solvent. Techniques for replacing the water content of a silica hydrogel with an organic solvent are reported in the literature, e.g., see S. S. Kistler, *J. Phys. Chem.*, 36, 52 (1932). Mechanistically, all that is required is that the silica hydrogel be filtered free of the aqueous medium in which it is prepared and contacted with successive aliquots of an appropriate organic solvent until all of the water has been extracted from the silica hydrogel.

The organic solvent employed to replace the water of the silica hydrogel should be selected on a basis of two criteria. First, the organic solvent should dissolve at least 10 weight % water and preferably should be completely miscible with water. Second, the organic solvent should have a relatively low critical point, i.e., a critical pressure not higher than about 100 atmospheres and preferably not higher than 65 atmospheres, and a critical temperature not higher than about 300° C. and preferably not higher than 250° C. Any organic solvent meeting these criteria may be employed. Suitable organic solvents include, inter alia, low boiling alcohols, such as methanol and ethanol, low boiling esters such as ethyl acetate, tetrahydrofuran, and others.

After the bulk of the water has been removed from the silica hydrogel with the organic solvent, it is necessary to treat the organic solvent so that it is rigorously dried and so that the water of the organic solvent in final equilibrium with the silica hydrogel is reduced to a level 200 parts per million or less, preferably to less than 150 parts per million. This step may be carried out conveniently be continuously withdrawing a portion of the organic solvent from contact with the silica hydrogel, passing such solvent through a drying column packed with molecular sieves, and returning the rigorously dried organic solvent to again contact the silica hydrogel.

The slurry of silica hydrogel and rigorously dried organic solvent then is transferred to a suitable apparatus for removal of the organic solvent therefrom by venting the organic solvent from the apparatus at a temperature and pressure above the critical point of the organic solvent. Techniques for carrying out this procedure are known and reported in the literature.

After the organic solvent has been removed, rigorously anhydrous air is admitted to the apparatus to facilitate removal of the silica aerogel. The air admitted to the apparatus should be dried to a dew point of less than about −60° C.

After being recovered, the silica aerogel should be calcined at a temperature of at least about 400° C. and preferably at least 500° C. In a stream of oxygen-containing gas having a dew point of less than about −50° C. and preferably less than −60° C.

The recovered silica aerogel, after preparation, should be stored under anhydrous conditions to prevent adsorption of moisture from the air.

For reasons not fully understood, the pore structure of the silica aerogels prepared by the above-described process differs significantly from the pore structure of silica aerogels prepared by the known Kistler process. Specifically, the silica aerogels prepared by the described process have both a large surface area and a large pore volume within the range previously described, whereas, the silica aerogels prepared by the Kistler process have a relatively small pore volume, usually less than 1.0 milliliter per gram. In addition, the silica aerogels prepared by the above-described process have a bulk density of about 0.1 gram per milliliter, whereas a corresponding silica aerogel made by the Kistler process has a bulk density of about 0.2 gram per milliliter.

The catalysts employed in the invention are prepared by despositing a suitable chromium compound on the silica aerogel support. The chromium catalyst should be deposited on the silica aerogel support under rigorously anhydrous conditions so that no moisture will be introduced into the silica aerogel to destroy its unique structure in subsequent processing steps of the catalyst preparation procedure.

One of the preferred catalysts for use in the practice of the present invention is made by depositing a conventional quantity of the order of about 0.5 - 3.0% of chromium oxide on the silica aerogel support. This can be done by simply admixing appropriate quantities of anhydous chromium oxide and the silica aerogel support and tumbling the materials together in a suitable vessel at an elevated temperature under reduced pressure. Under these conditions, the chromium oxide deposits itself substantially uniformly over the entire surface of the silica aerogel support. The chromium catalyst as thus prepared will be activated by being heated to an elevated temperature of the order of 475°–925° C. in a stream of rigorously anhydrous oxygen-containing gas following techniques known in the art.

To prepare catalysts in which the active chromium catalyst is an organo chromium compound such as dicyclopentadienyl chromium II, the organo chromium compound can be dissolved in an appropriate rigorously anhydrous organic solvent and mixed with the silica aerogel support. Thereafter, the solvent will be removed by heating under reduced pressure.

The following examples are set forth to illustrate more clearly the principle and practice of this invention to those skilled in the art. All parts and percentages set forth in the examples are parts and percentages by weight.

EXAMPLE 1

Part A — Preparation of Silica Aerogel

A stirred reactor was charged with 150 parts of water glass (N-grade manufactured by Philadelphia Quartz Company) and 570 parts of distilled water. The resulting mixture was cooled to approximately 2° C. and a 13% sulfuric acid solution was added to the stirred mixture at a rate of about 1.5 parts per minute until the pH of the mixture reached 6.5. Thereafter, the reaction mixture was heated to a temperature of approximately 95° C. and was stirred for 3 hours. The pH of the system was measured periodically, and, as required, small quantities of a 13% sulfuric acid solution were added to maintain the pH of the system at 6.5. The product was a silica hydrogel suspended in water.

The silica hydrogel prepared in the paragraph above was filtered free of the aqueous medium in which it was prepared and then was slurried in a 1% solution of ammonium nitrate for 15 minutes. This slurry was allowed to stand for approximately 1 hour so that the gel settled and the supernatent liquid was withdrawn and discarded. This procedure was repeated several times until the supernatent liquid gave a negative test for sulfate ion with a 1% barium chloride solution. This treatment freed the silica hydrogel of sodium ions.

The supernatent water of the slurry from the paragraph above was withdrawn from the reactor and replaced with absolute ethanol. The silica hydrogel was slurried with the ethanol for about 15 minutes, was allowed to stand for approximately 20 minutes, and the supernatent ethanol was withdrawn and discarded. This procedure was repeated four times to displace the water in the silica hydrogel with ethanol. The supernatent ethanol, after the last treatment, contained approximately 30,000 ppm of water.

The silica hydrogel from the paragraph above was transferred to a reaction vessel fitted with a bottom exit port, a porous glass frit sealing plate fitted just above the bottom exit port and a side exit port positioned just above the porous glass frit sealing plate. The vessel also was equipped with a stirrer and a liquid entry port at the top. The vessel then was charged with ethanol that had been rendered rigorously anhydrous (less than 100 ppm water) by passage through a drying column packed with Type 3-A molecular sieves. The silica hydrogel-ethanol slurry was gently stirred and ethanol was continously withdrawn from the bottom exit port at the same rate that additional rigorously anhydrous ethanol was charged to the vessel. This treatment was continued until the water content of the ethanol being withdrawn from the vessel had been reduced to 150 ppm. At this point, the operation was discontinued. The vessel contained approximately 3 parts of the silica hydrogel and 8 parts of anhydrous ethanol.

The slurry of silica hydrogel and anhydrous ethanol from the paragraph above was charged to a sealed pressure-resistant vessel fitted with a pressure relief valve that was set to open at a pressure of 7.9 megapascals (approximately 79 atmospheres). The reaction vessel was heated to 340° C. which generated a pressure of 7.9 megapascals, these conditions of temperature and pressure being above the critical point of ethanol. The temperature was maintained at 340° C. and the ethanol was vented from the reactor at a controlled rate by operation of the pressure relief valve. After all the ethanol had been removed, heating was discontinued and rigorously anhydrous air having a dew point of less than −60° C. was gradually admitted to the reactor to bring the vessel to ambient temperature and pressure.

The silica aerogel was recovered from the reactor described in the paragraph above and was transferred to an electrically-heated calcining reactor. The silica aerogel was calcined for 4 hours at 500° C. while passing a stream of rigorously anhydrous air having a dew point of less than −60° C. through the reactor.

The surface characteristics of the silica aerogel were determined by isothermal liquid nitrogen desorption analysis. The data were obtained by the use of an Aminco Adsorptomat, Model Number 4-4680. The data were calculated and interpreted by the method described by E. V. Ballou and O. K. Dollen in Analytical Chemistry, Vol. 32, page 532, 1960. The surface area of the product was 445 square meters per gram. The pore volume of the product was 3.25 milliliters per gram. The average pore radius of the sample was 147 Angstroms, this value being calculated by multiplying the pore volume by $2 \times 10^4$ and dividing the resulting product by the surface area.

From the isothermal liquid nitrogen desorption data. FIG. 1 was reproduced to show the percent of the sample's surface area contained in particles having particular pore radii. It will be noted that the silica aerogel has a wide distribution of pore sizes with no particles of a particular pore radius containing more than about 5 volume % of the total surface area of the product.

PART B — PREPARATION OF POLYMERIZATION CATALYST

A 1-liter round bottom flask was charged with 2 parts of chromium trioxide and 98 parts of the silica aerogel prepared in Part A above. The charged round bottom flask then was attached to a Buchi Rotovapor. The pressure within the Rotovapor apparatus was reduced to 12 kilopascals (approximately 0.12 atmosphere) and the temperature was raised to 70° C. and maintained at this temperature for 1 hour. The temperature then was raised to 120° C. At the end of the second hour, the pressure was lowered to 8 kilopascals (approximately 0.08 atmosphere) and the temperature was increased to 170° C. At the end of the third hour, the temperature was increased to 180° C. At the end of the fourth hour, the pressure was reduced to 0.4 kilopascals (approximately 0.004 atmosphere) and the temperature was raised to 205° C. Heating was continued for an additional 3 hours under these conditions. The catalyst then was cooled to ambient temperature and rigorously anhydrous air was bled into the Rotovapor to bring the pressure back to atmospheric pressure.

The orange-brown product then was transferred to a fluidized bed apparatus for activation. The catalyst was activated by being heated to 870° C. for a period of 4 hours while maintaining the catalyst in a fluidized condition by the passage of air through the fluidized bed. The air used for this purpose had been rigorously dried so that it had a dew point of less than −50° C.

The surface characteristics of the chromium oxide impregnated silica aerogel support were determined by isothermal liquid nitrogen desorption analysis. The results were substantially identical to those obtained with the silica aerogel and set forth in Part A above. Thus, impregnation and activation of the silica aerogel with the chromium oxide did not alter the surface characteristics of the silica aerogel.

PART C — POLYMERIZATION OF ETHYLENE

A stirred polymerization reaction vessel was charged with 0.1 part of the activated catalyst prepared in Part B. A small quantity of dry, oxygen-free isobutane was charged to the reactor, allowed to vaporize, and vented from the reactor to remove oxygen from the reactor. The reactor then was charged with 500 parts of isobutane and the system was brought to a pressure of 3.8 megapascals (approximately 38 atmospheres) with polymerization grade ethylene. The temperature was increased to 109° C. and the polymerization was initiated within 15 minutes as evidenced by a drop in pressure within the reactor. The polymerization was continued for two hours and additional quantities of ethylene were charged to the reactor as required to maintain the pressure at 3.8 kilopascals. At the end of this period, the reactor was vented and 425 parts of polyethylene were recovered. The productivity of the catalyst was 2,200 parts of polymer per part of catalyst per hour. The recovered polyethylene had a melt index of 5.2 as determined by ASTM 1238-70, Condition E. The polymer had a high load melt index of 198 as determined by ASTM 1238-70, Condition F.

EXAMPLE 2

Example 1 was repeated in all respects except that in Part A the slurry of the silica hydrogel and ethanol was removed from the reactor when the water content of the ethanol had been reduced to 4,000 ppm. The polyethylene resin produced with this catalyst had a melt index of 1.2 as determined by ASTM 1238-70, Condition E, and a high load melt index of 50 as determined by ASTM 1238-70, Condition F. The productivity of the catalyst was 1,900 parts of polymer per part of catalyst per hour.

It is apparent that the polyethylene resin produced in Example 1 — produced in accord with the present invention — has a much higher melt index than does the polyethylene resin produced in Example 2 by a method falling outside the present invention. The different polymerization results obtained are surprising, particularly in view of the close similarity of the processes employed to prepare the catalysts, and their silica aerogel supports.

Figure 2:
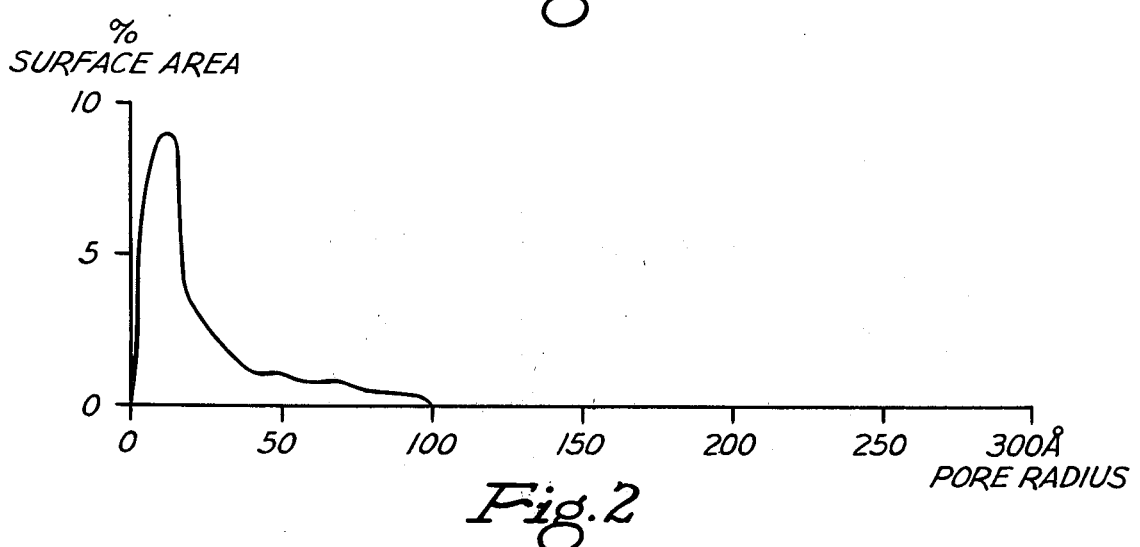
FIG. 2 of the drawings is a plot of % Surface Area. vs. Pore Radius of a silica aerogel prepared in accordance with the prior art teachings and which is not suitable for use in the practice of the present invention.

To provide an explanation for the observed differences in the experimental polymerization data obtained, the structure of the silica aerogel produced in Example 2 was studied by isothermal liquid nitrogen analysis employing the same apparatus and methods described in Example 1, Part A. The surface area of the silica aerogel was 392 square meters per gram. The pore volume was 1.25 milliliter per gram. The average pore radius was 65 Angstroms. FIG. 2 is a plot of the liquid nitrogen desorption data presented on the same basis employed in FIG. 1.

From the isothermal liquid nitrogen desorption data, including the plots of FIGS. 1 and 2, several differences are noted in the structure of the two experimentally-prepared silica aerogels:

1. The silica aerogel of Example 1 has a somewhat larger total surface area, i.e., 445 square meters per gram as compared to 392 square meters per gram.
2. The silica aerogel of Example 1 has a much larger pore volume, i.e., 3.25 milliliters per gram as compared to 1.25 milliliter per gram.
3. The silica aerogel of Example 1 has a wide distribution of pore radii, with no fraction of a particular pore radius representing more than about 5 volume % of the total surface area. The bulk of the surface area is constituted of pores having relatively large radii, the average pore radius being 147 Angstroms.
4. The silica aerogel of Example 2 has a narrow distribution of pore radii, with the fraction having a pore radius of about 20 Angstroms representing about 10 volume % of the total surface area. The bulk of the surface area is constituted of pores having relatively small radii, the average pore radius being 65 Angstroms.

In a further attempt to explain the differences in the experimental polymerization data obtained in Examples 1 and 2, transmission electron micrographs were obtained on the silica aerogels produced in Examples 1 and 2. Aliquots of the silica hydrogels in ethanol as prepared in Examples 1 and 2 were taken and transmission electron micrographs were prepared from these specimens. Comparison of the transmission electron micrographs established the following:

1. The micrographs of the two silica hydrogels were identical.
2. The micrograph of the silica hydrogel of Example 1 and the silica aerogel of Example 1 were identical. These data establish that the structure of the silica was not changed by removal of ethanol from the silica hydrogel, when the ethanol associated with the hydrogel contained 150 ppm water.
3. The micrographs of the silica hydrogel and the silica aerogel prepared in Example 2 were quite different from one another. These data establish that the structure of the silica is altered significantly by the removal of ethanol from the silica hydrogel, when the ethanol associated with the hydrogel contained 4,000 ppm water.

EXAMPLE 3

Part A

A silica aerogel was prepared by the procedure described in Example 1, Part A, with the exception that tetrahydrofuran was used in lieu of ethanol to displace the water of the silica hydrogel. The tetrahydrofuran was removed from the silica hydrogel above its critical point by operating at a temperature of 340° C. and a pressure of 6.6 megapascals (about 66 atmospheres).

Isothermal liquid nitrogen desorption analysis showed that the silica aerogel had a surface area of 395 square meters per gram, a pore volume of 3.25 milliliters per gram, and an average pore radius of 165 Angstroms. These figures are very similar to the figures obtained with the silica aerogel prepared in Example 1, Part A. The similarity of surface structure of the two silica aerogels indicates that the particular organic solvent employed in the manufacture of the silica aerogel is not critical, provided that its water content is reduced to 200 ppm or less and the organic solvent is removed from the silica hydrogel above its critical point.

Figure 3:
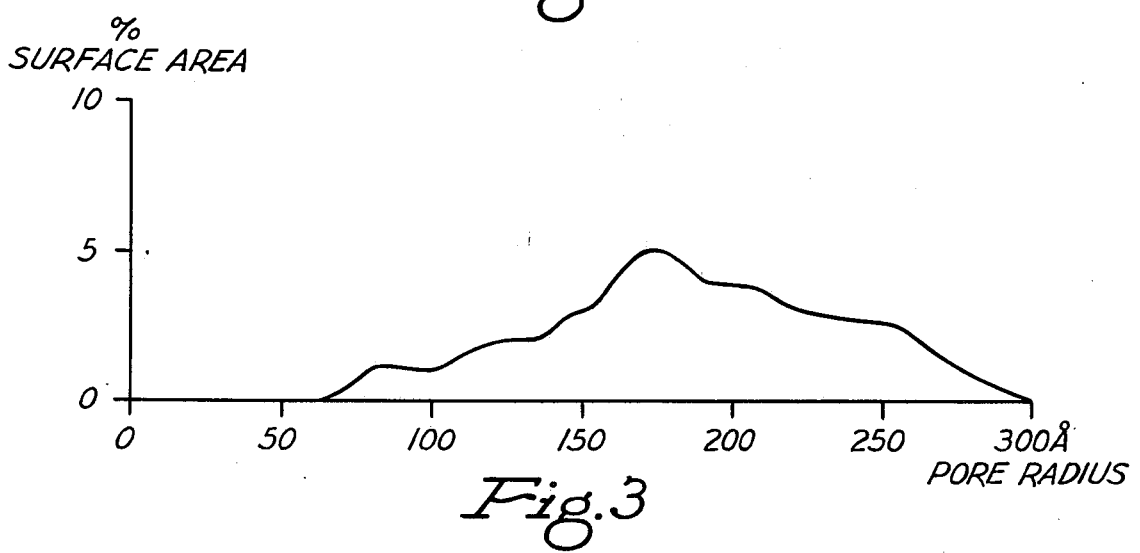
FIG. 3 of the drawings is a plot of % Surface Area vs. Pore Radius of a second silica aerogel employed as a catalyst support in the practice of the present invention.

FIG. 3 represents a plot of the isothermal liquid nitrogen desorption data on the same basis employed in FIG. 1. A comparison of FIG. 3 with FIG. 1 again shows that the two silica aerogels have very similar surface characteristics. The similarity of the two curves indicates that the particular organic solvent employed in the manufacture of the silica aerogel is not critical.

PART B

Chromium oxide was deposited on the silica aerogel of Part A by the same procedure described in Example 1, Part B. This catalyst, when employed to polymerize ethylene by the method described in Example 1, Part C, gives very similar polymerization results.

EXAMPLES 4 AND 5

Part A

Two additional silica aerogels were prepared by the procedure of Example 1, Part A, except that the organic solvent employed to displace the water of the silica hydrogel was, respectively, ethyl acetate and methanol.

The silica aerogel prepared with ethyl acrylate had a surface area of 400 square meters per gram, a pore radius of 2.5 milliliters per gram, and an average pore radius of 122 Angstroms.

The silica aerogel prepared with methanol had a surface area of 375 square meters per gram, a pore volume of about 2 milliliters per gram, and an average pore radius of 110 Angstroms.

Part B

Chromium oxide was deposited on the silica aerogel of Part A that had been prepared with methanol, employing the procedure of Example 1, Part B. This catalyst, when employed in the polymerization procedure of Example 1, Part C, gave a polyethylene resin having a melt index of 5.2 (ASTM 1238-70, Condition F) and a high load melt index of 198 (ASTM 1238-70, Condition E).

As examples of organic chromium compounds that can be supported on the silica aerogels to prepare catalyst compositions falling within the scope of the present invention, one can employ any of the active chromium compounds of the types disclosed in the following issued U.S. Pat. Nos.: 3,157,712, 3,324,095, 3,324,101, 3,687,920, 3,709,853, 3,709,954, 3,756,998, 3,757,002, 3,806,500. Such organic chromium compounds can be deposited on the silica aerogels by the techniques discussed earlier in this application.

The supported chromium catalysts of this invention can be employed not only in the polymerization of ethylene by the Particle Form Process as discussed in detail in this application, but also in other types of ethylene processed including the polymerization of ethylene in a fluidized bed of the supported silica catalyst by techniques similar to those disclosed in certain of the issued U.S. patents set forth in the paragraph above.

I claim:

1. In a process for the preparation of an ethylene polymerization catalyst in which a chromium polymerization catalyst is deposited on a silica support and activated; the improvement which consists of preparing the supported catalyst under rigorously anhydrous conditions and employing as the catalyst support a silica aerogel having a surface area of at least about 300 square meters per gram and a pore volume of at least about 2 milliliters per gram, said values being determined by isothermal liquid nitrogen desorption analysis; said silica aerogel having been prepared by a modified Kistler process consisting essentially of the steps of:
   a. preparing a silica hydrogel,
   b. treating the silica hydrogel with an organic solvent that will dissolve at least 10 weight % water to free the silica hydrogel of water, at least the final contact being with a rigorously anhydrous organic solvent so that the organic solvent, after reaching equilibrium with the silica hydrogel, contains less than 200 ppm of water,
   c. removing the organic solvent from the organic solvent — silica hydrogel mixture of step (b) by heating the mixture to above the critical point in a pressure-resistant vessel and releasing the organic solvent therefrom at a pressure at least equal to the critical pressure of the organic solvent,
   d. cooling the silica aerogel from step (c) to ambient temperature and pressure under rigorously anhydrous conditions, and
   e. calcining the silica aerogel from step (d) at an elevated temperature in a rigorously anhydrous environment.

2. In a process for the preparation of an ethylene polymerization catalyst in which chromium oxide is admixed with a silica support, the admixture is heated under reduced pressure to uniformly deposit the chromium oxide on the silica support, and the catalyst is activated by being heating to at least 475° C. in a stream of dry air; the improvement which consists essentially of employing as the catalyst support a silica aerogel having a surface area of at least about 300 square meters per gram and a pore volume of at least about 2 milliliters per gram, said values being determined by isothermal liquid nitrogen desorption analysis; said silica aerogel having been prepared by a modified Kistler process consisting essentially of the steps of:

a. preparing a silica hydrogel, b. treating the silica hydrogel with an organic solvent that will dissolve at least 10 weight % water to free the silica hydrogel of water, at least the final contact being with a rigorously anhydrous organic solvent so that the organic solvent, after reaching equilibrium with the silica hydrogel, contains less than about 200 ppm of water, c. removing the organic solvent from the organic solvent - silica hydrogel mixture of step (b) by heating the mixture to above the critical point in a pressure-resistant vessel and releasing the organic solvent therefrom at a pressure at least equal to the critical pressure of the organic solvent, d. cooling the silica aerogel from step (c) to ambient temperature and pressure under rigorously anhydrous conditions, and e. calcining the silica aerogel from step (d) at an elevated temperature in a rigorously anhydrous environment.

3. An ethylene polymerization catalyst prepared by the process of claim 1.

* * * * *